US005629363A

United States Patent [19]
Abber et al.

[11] Patent Number: 5,629,363
[45] Date of Patent: May 13, 1997

[54] AQUEOUS-BASED, SHEAR-THINNING, ERASABLE INK AND ROLLER-BALL PEN CONTAINING SAME

[76] Inventors: Herman Abber, 60 Brian Dr., Brockton, Mass. 02401; Takao Machida, 2-11-13 Daita, Abiko-shi, Chiba-ken, 270-11, Japan; Mark T. Smith, 2A Prospect St., South Dartmouth, Mass. 02748

[21] Appl. No.: 551,545

[22] Filed: Nov. 1, 1995

Related U.S. Application Data

[63] Continuation-in-part of Ser. No. 483,208, Jun. 7, 1995, and Ser. No. 194,466, Feb. 10, 1994.

[51] Int. Cl.$^6$ .......................... C09D 11/18; C08K 3/34; C08L 25/10; C08L 9/08
[52] U.S. Cl. .......................... 523/161; 523/160; 524/446; 524/575
[58] Field of Search .................... 523/160, 161; 524/446, 575

[56] References Cited

U.S. PATENT DOCUMENTS

| | | | |
|---|---|---|---|
| 4,145,148 | 3/1979 | Fukuoka | 401/209 |
| 4,407,985 | 10/1983 | Muller | 523/161 |
| 4,671,691 | 6/1987 | Case et al. | 106/22 R |
| 4,686,246 | 8/1987 | Gajria | 523/161 |
| 4,687,791 | 8/1987 | Miyajima et al. | 523/161 |
| 4,786,198 | 11/1988 | Zgambo | 106/22 R |
| 4,940,628 | 7/1990 | Lin et al. | 523/161 |
| 5,013,361 | 5/1991 | Case et al. | 106/23 R |
| 5,217,255 | 6/1993 | Lin et al. | 106/23 B |
| 5,362,167 | 11/1994 | Loftin | 524/575 |
| 5,389,717 | 2/1995 | Santini et al. | 524/575 |
| 5,534,587 | 7/1996 | Smith | 523/160 |

FOREIGN PATENT DOCUMENTS

PCTUS9310231  5/1994  WIPO.

*Primary Examiner*—Peter A. Szekely
*Attorney, Agent, or Firm*—Kriegsman & Kriegsman

[57] ABSTRACT

An aqueous-based, shear-thinning, erasable ink and a roller-ball pen containing same. In a preferred embodiment, the ink comprises a blend of three different non-carboxylated, styrene-butadiene aqueous emulsions, a water-insoluble or water-dispersible pigment and a shear-thinning, viscosity-adjustment agent in the form of a silicate clay. The ink further comprises an antioxidant preparation, which includes tocopherol and vitamin C, for use in extending the time period over which the ink remains erasable after being applied to a substrate, a shear-stabilizing agent in the form of potassium oleate for use in preventing unwanted coagulation of the styrene-butadiene copolymer due to shear, a pH-adjusting agent in the form of triethanolamine for shifting the pH of the ink to a pH of about 9–10, and an anti-drying agent in the form of a 3:1 mixture of sorbitol to glycerine. The pen comprises a barrel for storing a quantity of the ink, the barrel being made of polypropylene and having an open top end; a hollow tip made of a stainless steel, a nickel-silver alloy or a polyoxymethylene and having a top end and a bottom end, the top end being shaped to define a ball socket; a ball rotatably received in the ball socket and made of a sintered ceramic material; and an elongated hollow connector made of a polyoxymethylene and having an open top end adapted to receive the bottom end of the hollow tip and an open bottom end adapted to be received in the open top end of the barrel. The ball has a diameter of about 1.0 mm or greater. The socket has a maximum internal width that exceeds the diameter of the ball by approximately 0.015–0.025 mm and is shaped to enable the ball to move axially therewithin a distance of approximately 0.03–0.07 mm.

36 Claims, 2 Drawing Sheets

AQUEOUS-BASED, SHEAR-THINNING, ERASABLE INK AND ROLLER-BALL PEN CONTAINING SAME

CROSS-REFERENCE TO RELATED APPLICATIONS

The present application is a continuation-in-part of presently pending U.S. patent application Ser. No. 08/483,208, filed Jun. 7, 1995, pending and is a continuation-in-part of presently pending U.S. patent application Ser. No. 08/194,466, filed Feb. 10, 1994, pending both of which are incorporated herein by reference.

BACKGROUND OF THE INVENTION

The present invention relates generally to erasable inks and more particularly to erasable inks suitable for use in roller-ball or ball-point pens and to roller-ball and ball-point pens containing erasable inks.

When using writing instruments to produce written images, characters or highlight marks on a marking substrate, it is not necessarily desirable to obtain a high degree of indelibility. For example, one may want to be able to make a mark on a marking substrate which is easily erasable therefrom by substantially non-abrasive mechanical means, such as by an ordinary pencil eraser, a dry cloth, etc. To be truly erasable, the ink must be capable of being substantially completely removed from the marking substrate to which it has been applied without causing significant damage to the marking substrate. For the reasons to be discussed below, this goal is often particularly difficult to attain when the marking substrate is porous, as in the case of conventional stationery paper.

Conventional stationery paper is essentially a mat of randomly oriented cellulose fibers. Thus, conventional stationery paper consists of solid structural members, namely cellulose fibers, having numerous minute voids therebetween. From the foregoing, it may readily be seen that the formulator or designer of an erasable ink must prevent the colorant portion of the ink from penetrating, to any substantial degree, into the voids in the surface being written upon because, if there is substantial penetration of the colorant portion of the ink into the voids, the subsequent removal of the colorant by mechanical means cannot be accomplished without causing damage to the writing surface. Likewise, it may readily be seen that, for a writing medium to be erasable, the colorant must be prevented from affixing itself to any substantial degree of permanence, either by chemical reaction or as a result of mere physical attraction, to the solid members of the paper substratum. The foregoing considerations tend to suggest that an erasable ink should comprise relatively large colorant particles which are incapable of penetrating the voids of a paper substrate. However, this approach to achieving erasibility has not been very successful, particularly where the ink has been dispensed from a roller-ball or ball-point pen, since inks containing relatively large colorants often have difficulty in being passed through the very small clearance between the ball and socket of a roller-ball or ball-point pen.

Another approach that has been used in an effort to achieve erasability in a roller-ball or ball-point pen has been to include a mechanically-strippable film-forming or resinous material in the ink that prevents the colorant from penetrating the voids in the paper and from becoming affixed to the solid members of the paper substratum. One class of such inks are organic or oil-based inks having a high viscosity e.g., at least several thousand cps, and are used in ball-point pens. An example of the foregoing type of ink is described in U.S. Pat. No. 4,407,985, inventor Muller, which issued Oct. 4, 1983 and which is incorporated herein by reference. The Muller ink composition is said to be characterized by an initial, yet transient, erasability from an absorbent paperlike writing surface by ordinary pencil erasers when applied by a ball-point writing instrument. The Muller ink composition comprises polar elastomers, such as butadiene/acrylonitrile copolymer rubbers and vinyl acetate/ethylene copolymer rubbers, and mixtures thereof, either alone or in admixture with cis-1,4-polyisoprene (natural rubber or synthetic rubber), pigment, and a solvent system. The polar elastomer is present in the range of about 14–25% by weight of the ink and the pigment is present in amount sufficient to impart color and intensity to a trace of the ink when applied to a substrate such as paper. The solvent system essentially comprises a volatile component having a boiling point less than about 180° C. and an essentially non-volatile component which includes pigment vehicle having a boiling point greater than about 300° C. and low viscosity plasticizer having a boiling point greater than 180° C. but less than 300° C., the solvent system being present in amount sufficient to impart a final ink viscosity in the range of about 1.5 million cps.

Another example of an oil-based erasable ink used in a ball-point pen is described in U.S. Pat. No. 4,687,791, inventors Miyajima et al., which issued Aug. 18, 1987, and which is incorporated herein by reference. The Miyajima ink comprises a rubber component, a volatile solvent, a pigment and a nonvolatile solvent, which additionally comprises finely divided powders of an inorganic compound inactive to other ink components contained therein, a semisolid substance, a soft solid substance having a melting point not higher than 130° C., a combination of finely divided powders of an inorganic compound inactive to other ink compositions contained therein and a semisolid substance, or a combination of finely divided powders of an inorganic compound inactive to other ink compositions contained therein and a soft solid substance having a melting point not higher than 130° C.

One problem that has been noted generally in connection with organic or oil-based inks, whether erasable or not, is that such inks, when employed in a ball-point pen, often do not produce a pleasant-feeling writing effect due to the comparatively large amount of force necessary to dispense the highly-viscous organic ink through the small clearance between the ball and socket of the pen. In addition, such inks, due to their inherent fluid characteristics, often have a tendency to produce globs and skips when dispensed from ball-point pens. Such inks also tend to bleed unacceptably through conventional stationery paper and often possess toxicity and a noxious odor. On the other hand, aqueous-based inks, whether erasable or not, typically have a comparatively lower viscosity than do oil-based inks and tend to avoid many of the problems associated with oil-based inks; however, also as a result of their comparatively low viscosity, aqueous-based inks cannot typically be used in conventional ball-point pens. For this reason, aqueous-based inks have traditionally been dispensed from roller-ball pens comprising the combination of an absorbent filler and one or more absorbent feed rods ("nibs"). (See, for example, U.S. Pat. No. 4,145,148, inventor Fukuoka, which issued Mar. 20, 1979, and which is incorporated herein by reference.) The filler is typically disposed in the reservoir of the pen, and the nibs typically interconnect the reservoir to the environs of the ball and socket of the pen. Alternatively, aqueous-based inks have also been dispensed from roller-ball pens lacking a filler but comprising one or more nibs. Recently, however, for example, in U.S. Pat. Nos. 4,671,691, 4,686,246, 5,013,361 and 4,786,198, all of which are incorporated herein by reference, there are disclosed aqueous-based, non-erasable inks suitable for use in filler-less, nibless, roller-ball pens. Such inks include a material which endows the inks with the property of being shear-thinning, i.e., the inks are comparatively highly viscous at rest (although less viscous than the inks traditionally used in ball-point pens), but when subjected to the high shear rates produced during writing, become substantially less viscous, e.g., less than 100 cps. Examples of shear-thinning materials disclosed in the aforementioned patents include gums, such as xantham gum.

In U.S. Pat. No. 5,217,255, inventors Lin et al., which issued Jun. 8, 1993, and which is incorporated herein by reference, there is disclosed an erasable system including an element having a porous marking surface and an erasable marking composition for applying markings to the porous marking surface. The Lin et al. marking composition comprises an aqueous dispersion of particles of film-forming polymeric materials and a colorant, the Lin et al. marking composition being said to provide an erasable, substantially water-insoluble coalesced residue on a porous marking surface. Especially preferred polymeric materials for the Lin et al. marking composition include copolymers of styrene, such as styrene-butadiene. PLIOLITE 3757, which Lin et al. describes as a styrene-butadiene latex available commercially from Goodyear Tire and Rubber Company and containing about 70% by weight styrene-butadiene, is identified by Lin et al. as an example of a suitable polymeric film-forming material. The Lin et al. marking composition may include ingredients for controlling or adjusting the rheological properties of the marking composition. Such ingredients are said to include thixotropic or gelling agents such as clays, silicas or water-insoluble, water-soluble or water-miscible polymeric binder materials or polymeric shear thinning providing materials, such as xanthan gum, among others. Xanthan gum is said to be the preferred material for controlling rheological properties, and preferred amounts of xanthan gum are amounts between about 0.05 to about 2 percent by weight of the composition.

In U.S. Pat. No. 5,389,717, inventors Santini et al., which issued Feb. 14, 1995, and which is incorporated herein by reference, there is disclosed a marking composition that is said to be erasable for an extended period of time from a porous marking substrate using a common pencil eraser. The Santini et al. composition comprises a noncarboxylated styrene-butadiene copolymer resin, a colorant and an aqueous solvent. PLIOLITE® 2108, which is said to have a styrene-butadiene ratio of 29:71 and which is said to be commercially available from Goodyear Tire and Rubber Company, is said to be a particularly preferred resin for use in the Santini et al. composition. The Santini et al. composition may further include additives, such as coalescing agents, water-soluble or associative thickeners, release agents, surfactants which are preferably non-carboxylated, and the like. The Santini et al. composition is said to be suitable for use in porous-tipped writing instruments, such as felt tipped markers; however, the Santini et al. composition is said not to be limited to such markers and may be used in ballpoint and fountain pens, as paints for application with brushes, rollers, air brushes and the like.

In commonly-assigned PCT Application No. PCT/US93/10231, which was published on May 11, 1994 under International Publication Number WO 94/10251 and which is incorporated herein by reference, there is disclosed an erasable writing medium composition suitable for use in porous tip pens and roller-ball pens. According to one embodiment, the composition is adapted for use in fillerless, nibless, roller-ball pens and comprises a non-carboxylated styrene butadiene latex emulsion, a water-insoluble pigment and tragacanth gum. The composition may further include additives such as a fluorochemical surfactant and a 2:1 mixture of Sorbitol and glycerine. The aforementioned patent also discloses using a ceramic ball, instead of a metal ball, in a roller-ball or ball-point pen.

One problem that the present inventors have observed when aqueous-based erasable inks of the type described above are used in conventional roller-ball pens is that such inks tend to corrode those components of the roller-ball pen contacted therewith. Another problem is that such inks tend to be unduly unstable and are easily agglomerated by shear or pH stresses. Such stresses are common during the mixing of such inks, during the filling of roller-ball pens with such inks and during the dispensing of such inks using roller-ball pens. Still another problem is that such inks tend to exhibit less than optimal performance in terms of writability, erasability and "cap-off" (the period of time after which an uncapped pen becomes unusable due to the drying of ink on the tip of the pen).

SUMMARY OF THE INVENTION

It is an object of the present invention to provide a novel aqueous-based erasable ink suitable for use in roller-ball pens.

It is another object of the present invention to provide an erasable ink as described above that overcomes at least some of the shortcomings associated with existing erasable inks.

It is still another object of the present invention to provide an erasable ink as described above that can be used to make markings erasable from both porous marking substrates and non-porous marking substrates using substantially non-abrasive mechanical means.

For purposes of the present specification and claims, a "porous marking substrate" is defined to mean a marking substrate which is sufficiently porous to permit the penetration thereinto of colorants of the type typically found in conventional non-erasable inks and which, when contacted with the present composition, causes the emulsion therein to break. Examples of conventional porous marking substrates include, but are not limited to, conventional stationery papers and similar papers which have been treated in such a way that, when contacted with water, ions (e.g., protons and/or cations) are dissolved therefrom.

Also for purposes of the present specification and claims, a "non-porous marking substrate" is defined to mean a substrate which is insufficiently porous to permit the penetration thereinto of colorants of the type typically found in conventional non-erasable inks and which, when contacted with the present composition, causes the emulsion therein to break. Examples of non-porous marking substrates include, but are not limited to, smooth-surfaced writing panels made of glass, plastic, metal, sealed-wood, coated paper and the like.

Also for purposes of the present specification and claims, the term "substantially non-abrasive mechanical means" is intended to include, but is not limited to, dry cloths, tissues, ordinary pencil erasers and the like.

It is a further object of the present invention to provide an erasable ink as described above that maintains a high degree of erasability for an extended period of time.

In furtherance of the above and other objects to be described or to become apparent below, there is hereinafter provided an ink that is erasable from both porous and non-porous marking substrates by substantially non-abrasive mechanical means, said ink comprising:

(a) a latex emulsion blend comprising a first non-carboxylated styrene-butadiene latex emulsion and a second non-carboxylated styrene-butadiene latex emulsion, said latex emulsion blend being characterized by its ability to be transformed, upon being contacted with the surface of a porous marking substrate, from a first state in which said latex emulsion blend is stable to a second state in which said latex emulsion blend is unstable and the styrene-butadiene phase rapidly agglomerates to form a cohesive film deposited directly on the surface of the porous marking substrate with low adhesion thereto;

(b) a colorant dispersed in the latex emulsion blend, the colorant being characterized by its association with the cohesive rubber phase film when said latex emulsion blend is transformed into said second state; and (c) a shear-thinning, viscosity-adjustment agent.

Preferably, the shear-thinning, viscosity-adjustment agent comprises an inorganic clay material, such as a hydrous sodium lithium magnesium silicate synthetic smectite type clay, which is added to the ink in sufficient quantity to give the ink a viscosity of about 30 to 300 cps when measured at 20° C. using a rotary viscometer in which a tapered cone is rotating at a fixed velocity to give a shear rate of 0.2 reciprocal seconds.

According to one embodiment, the aforementioned latex emulsion blend comprises a first non-carboxylated styrene-butadiene latex emulsion which contains about 40% total solids by weight and which has a Brookfield viscosity at 25° C. of about 30 cps, a pH of about 10.5–11.7, a Mooney value of about 150–160, a surface tension of about 55–65 dynes/cm, a particle size of about 650 Angstroms and a bound styrene content of about 21–29% (preferably about 21–25%), and a second non-carboxylated styrene-butadiene latex emulsion which contains about 70% total solids by weight and which has a Brookfield viscosity at 25° C. of about 1200 cps, a pH of about 10.0–10.5, a Mooney value of about 70–75, a surface tension of about 32–36 dynes/cm, and a bound styrene content of about 22–26%. Preferably, said first non-carboxylated styrene-butadiene latex emulsion constitutes about 45–50%, by weight, of the total composition, and said second non-carboxylated styrene-butadiene latex emulsion constitutes about 20–25%, by weight, of the total composition, said first and said second non-carboxylated styrene-butadiene latex emulsions together constituting approximately 70%, by weight, of the total composition.

According to another embodiment, said latex emulsion blend comprises the above-described first and second non-carboxylated styrene-butadiene latex emulsions and further comprises a third non-carboxylated styrene-butadiene latex emulsion, said third non-carboxylated styrene-butadiene latex emulsion containing about 47% total solids by weight and having a Brookfield viscosity at 25° C. of about 200 cps, a pH of about 9.5–10.0, a Mooney value of about 70–75, a surface tension of about 60–65 dynes/cm, a particle size of about 640–720 Angstroms and a bound styrene content of about 22–26%. Preferably, said first non-carboxylated styrene-butadiene latex emulsion constitutes about 30–50% (more preferably about 40%), by weight, of the total composition, said second non-carboxylated styrene-butadiene latex emulsion constitutes about 5–20% (more preferably about 10%), by weight, of the total composition, and said third non-carboxylated styrene-butadiene latex emulsion constitutes about 10–30% (more preferably about 20%), by weight, of the total composition, said first, second and third non-carboxylated styrene-butadiene latex emulsions together constituting approximately 70%, by weight, of the total composition.

According to still another embodiment, said latex emulsion blend comprises the above-described first and third non-carboxylated styrene-butadiene latex emulsions. Preferably, said first non-carboxylated styrene-butadiene latex emulsion constitutes about 30–50%, by weight, of the total composition, and said third non-carboxylated styrene-butadiene latex emulsion constitutes about 10–30%, by weight, of the total composition, said first and said third non-carboxylated styrene-butadiene latex emulsions together constituting approximately 70%, by weight, of the total composition.

The erasable ink of the present invention preferably further includes an antioxidant, such as a tocopherol (vitamin E), which is used to extend the period of time over which the composition remains erasable after being applied to a marking substrate. The time-extending effect of the tocopherol may be further enhanced by combining the tocopherol with vitamin C.

The above-described erasable ink preferably further comprises an anti-corrosion agent, such as ethylenediaminetetraacetic acid (EDTA) and/or benzotriazol, which is used to prevent corrosion caused by the ink to the tip of a pen containing the ink.

The above-described erasable ink preferably further comprises a shear-stabilizing agent which is included in the composition to prevent coagulation of the discontinuous rubber phase under conditions of high shear, such as during formulation (i.e., mixing) of the composition or during application of the composition to a marking substrate. A particularly preferred shear-stabilizing agent is potassium oleate.

The above-described erasable ink preferably further comprises a pH-adjusting agent, which is used to shift the pH of the composition to a pH of about 9–10. A particularly preferred pH-adjusting agent is triethanolamine (TEA).

The above-described erasable ink preferably further comprises an anti-drying agent. Preferably, the anti-drying agent comprises a 1:1, 2:1 or 3:1 mixture of sorbitol and glycerine, respectively. A 3:1 mixture of sorbitol to glycerine is particularly preferred.

The above-described erasable ink may further include an alkyl acrylate copolymer emulsion for use in improving the smoothness of writing of the ink.

The present invention is also directed to the combination of the above-described erasable ink and a writing instrument. Preferably, the writing instrument is a filler-less, nib-less, roller-ball pen. The filler-less, nib-less, roller-ball pen preferably comprises (a) a barrel adapted for storing a quantity of ink, said barrel having an open top end; (b) a hollow tip, said hollow tip being made of metal or polyoxymethylene and having a top end and a bottom end, said top end being shaped to define a ball socket; (c) a ball rotatably received in said ball socket, said ball being made of a non-metallic material; and (d) an elongated hollow connector, said elongated hollow connector having an open top end adapted to receive the bottom end of said tip and an open bottom end adapted to be received in the open top end of said barrel.

Preferably, said barrel is made of polypropylene, said tip is made of polyoxymethylene, stainless steel or a "nickel-silver" alloy, said ball is made of a sintered ceramic or tungsten carbide, and said elongated hollow connector is made of a polyoxymethylene. The ball has a diameter of approximately 1.0 mm or greater, and the socket has a maximum internal width that exceeds the diameter of the ball by approximately 0.015–0.025 mm and is shaped to enable the ball to move axially therewithin a distance of approximately 0.03–0.07 mm.

The present invention is further directed to a method for making erasable markings on both porous and non-porous marking substrates using the above-described erasable ink and pen.

Additional objects, as well as features and advantages, of the present invention will be set forth in part in the detailed description which follows, and in part will be obvious from the detailed description or may be learned by practice of the invention. In the description, reference is made to the accompanying drawings which form a part thereof and in which is shown by way of illustration specific embodiments for practicing the invention. These embodiments will be described in sufficient detail to enable those skilled in the art to practice the invention, and it is to be understood that other embodiments may be utilized and that changes may be made without departing from the scope of the invention. The following detailed description is, therefore, not to be taken in a limiting sense, and the scope of the present invention is best defined by the appended claims.

BRIEF DESCRIPTION OF THE DRAWINGS

The accompanying drawings, which are hereby incorporated into and constitute a part of this specification, illustrate a preferred embodiment of the invention and, together with the description, serve to explain the principles of the invention. In the drawings wherein like reference numerals represent like parts.

DETAILED DESCRIPTION OF PREFERRED EMBODIMENTS

Figure 1:
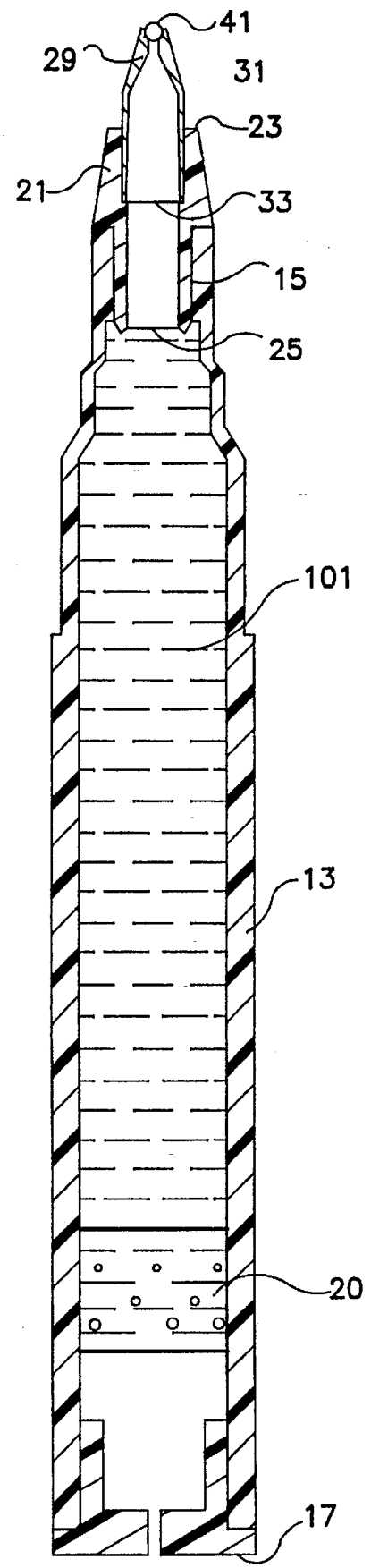
FIG. 1 is a section view of one embodiment of a filler-less, nib-less, roller-ball pen constructed according to the teachings of the present invention.

Referring to FIG. 1, there is illustrated one embodiment of a filler-less, nib-less, roller-ball pen constructed according to the teachings of the present invention, said filler-less, nib-less, roller-ball pen being represented generally by reference numeral 11.

Pen 11 comprises a barrel member 13, which has an open top end 15 and an open bottom end 17. A quantity of an ink 101 to be hereinafter described is loaded into barrel member 13, as is a highly-viscous, jelly-like follower 20. Preferably, barrel member 13 is made of polypropylene.

Pen 11 also comprises an elongated hollow connector 21. Connector 21 has an open top end 23 and an open bottom end 25, open bottom end 25 being securely mounted within open top end 15 of barrel 13. Connector 21 is preferably made of a polyoxymethylene.

Pen 11 additionally comprises a hollow tip 29, tip 29 having a top end 31 and a bottom end 33. Top end 31 is shaped to include a ball socket 35. Bottom end 33 is securely mounted within top end 23 of connector 21. Tip 29 is preferably made of a stainless steel (e.g., felite SUS 430 wherein C<0.05%, Si<1.00%, Mn<2.00%, P<0.050%, S<0.150%, Pb<0.30%, Te<0.08%, Cr<19.00–21.00% and Mo<1.5–2.5%), a "nickel-silver" alloy (e.g., Cu~57.0–61.0%, Ni~14.0–16.0%, Mn~0–0.5%, Fe<0.25%, Pb~2.5–3.5% and Zn-residual) or a polyoxymethylene.

Pen 11 further comprises a ball 41 rotatably received in ball socket 35. Ball 41 is made of a non-metallic material, preferably a sintered ceramic, such as a silicon-carbide, zirconium oxide or aluminum oxide. Tungsten-carbide may also be used as a ball material but is not as preferred as sintered ceramics.

Examples of suitable combinations of tips 29 and balls 41 include, but are not limited to, the following: (1) polyoxymethylene tip/SiC ball; (2) stainless steel tip/SiC ball; (3) nickel-silver tip/tungsten carbide ball; (4) nickel-silver tip/SiC ball; and (5) stainless steel tip/tungsten carbide ball.

Figure 2:
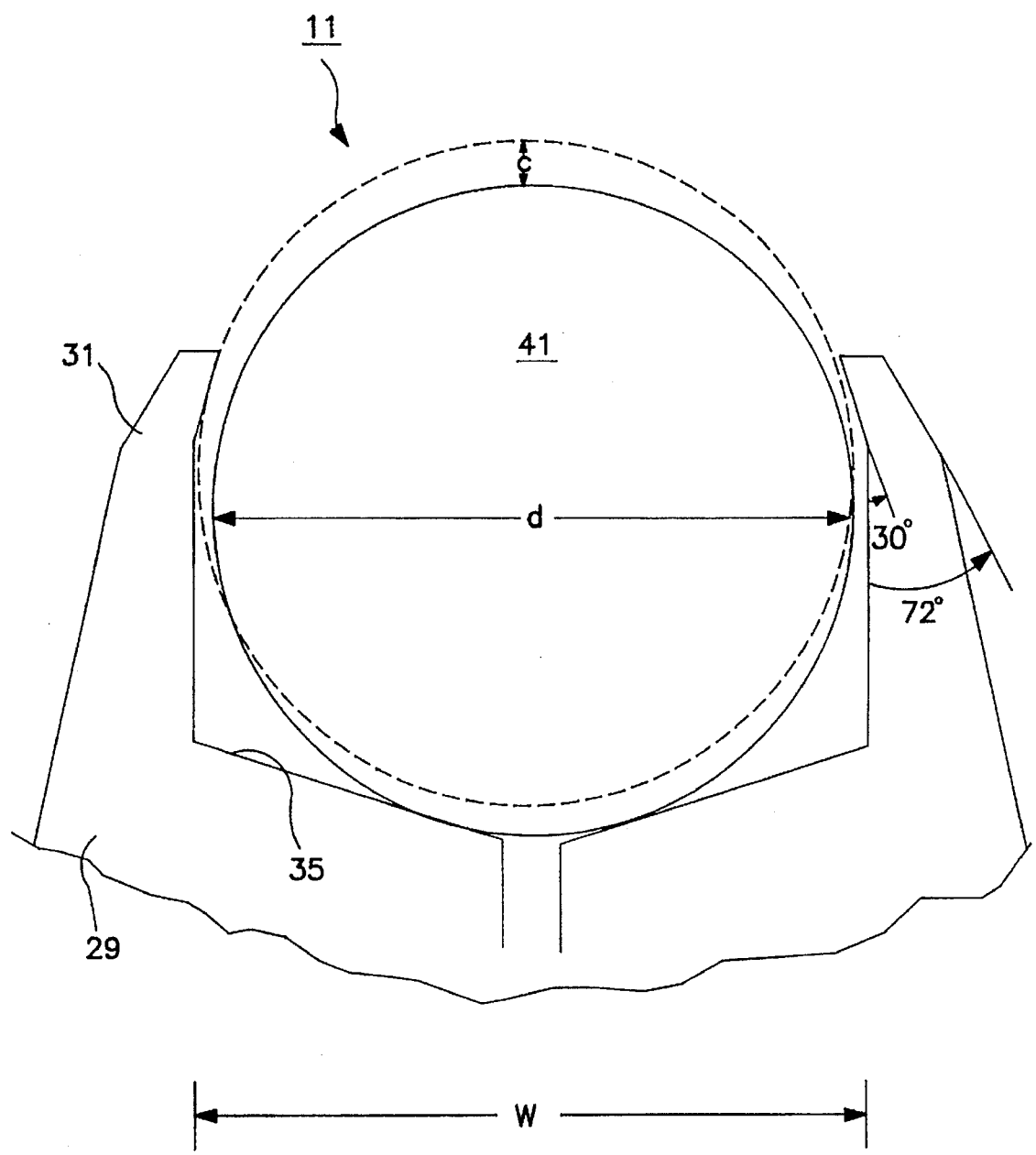
FIG. 2 is an enlarged fragmentary section view of the filler-less, nib-less, roller-ball pen shown in FIG. 1, illustrating details of the writing end of the pen.

Additional details of ball 41 and socket 35 are shown in FIG. 2. Referring to FIG. 2, ball 41 has a diameter d of approximately 1.0 mm or greater. Socket 35 has a maximum internal width w that exceeds the diameter of ball by approximately 0.015–0.025 mm. In addition, socket 35 is shaped to enable ball 41 to move axially therewithin a distance c of approximately 0.03-0.07 mm.

Referring back to FIG. 1, ink 101 is an erasable ink that is erasable from both porous and non-porous marking substrates by substantially non-abrasive mechanical means. In accordance with the teachings of the present invention ink 101 comprises (a) a latex emulsion blend comprising two or more non-carboxylated styrene-butadiene latex emulsions, said latex emulsion blend being characterized by its ability to be transformed, upon being contacted with the surface of a porous marking substrate, from a first state in which said latex emulsion blend is stable to a second state in which said latex emulsion blend is unstable and the styrene-butadiene phase rapidly agglomerates to form a cohesive film deposited directly on the surface of the porous marking substrate with low adhesion thereto; (b) a colorant dispersed in the latex emulsion blend, the colorant being characterized by its association with the cohesive rubber phase film when said latex emulsion blend is transformed into said second state; and (c) a shear-thinning, viscosity-adjustment agent.

Preferably, the shear-thinning, viscosity-adjustment agent comprises an inorganic clay material, such as a hydrous sodium lithium magnesium silicate synthetic smectite type clay. Examples of such an inorganic clay material include Laponite® XLG rheological additive, Laponite®S rheological additive and Laponite® RD rheological additive, all of which are commercially available from Southern Clay Products, Inc., Gonzales, Tex. Preferably, the clay material is added to the ink in the form of a solution of Laponite® XLG or Laponite® RD in glycerine and water (3% Laponite®/40% glycerine/57% water), the 3% Laponite® solution constituting about 3–10%, preferably about 7%, by weight, of ink 101. The addition of the aformentioned amount of the shear-thinning viscosity-adjustment agent gives ink 101 a viscosity of about 30 to 300 cps when measured at 20° C. using a rotary viscometer in which a tapered cone is rotating at a fixed velocity to give a shear rate of 0.2 reciprocal seconds.

The colorant of ink 101 is preferably a water-insoluble or water-dispersible pigment that is also oliophilic. Such pigments may be selected from among standard industry pigments which are known to be well-suited for being dispersed in aqueous systems and which are capable of associating with the rubber phase of a non-carboxylated styrene-butadiene latex emulsion, as opposed to being associated with the water phase thereof. Examples of such pigments are carbon black and ultra-fine fluorescent pigments, as well as mixtures thereof. Other pigments, dyes and toners which behave in the same manner may also be used in ink 101. Generally, the colorant is present in an amount constituting about 2–5%, by weight, of ink 101.

According to one embodiment, the aforementioned latex emulsion blend comprises a first non-carboxylated styrene-butadiene latex emulsion which contains about 40% total solids by weight and which has a Brookfield viscosity at 25° C. of about 30 cps, a pH of about 10.5–11.7, a Mooney value of about 150–160, a surface tension of about 55–65 dynes/cm, a particle size of about 650 Angstroms and a bound styrene content of about 21–29% (preferably about 21–25%), and a second non-carboxylated styrene-butadiene latex emulsion which contains about 70% total solids by weight and which has a Brookfield viscosity at 25° C. of about 1200 cps, a pH of about 10.0–10.5, a Mooney value of about 70–75, a surface tension of about 32–36 dynes/cm, and a bound styrene content of about 22–26%. Preferably, said first non-carboxylated styrene-butadiene latex emulsion constitutes about 45–50%, by weight, of ink 101, and said second non-carboxylated styrene-butadiene latex emulsion constitutes about 20–25%, by weight, of ink 101, said first and said second non-carboxylated styrene-butadiene latex emulsions together constituting approximately 70%, by weight, of ink 101.

According to another embodiment, said latex emulsion blend comprises the above-described first and said second non-carboxylated styrene-butadiene latex emulsions and further comprises a third non-carboxylated styrene-butadiene latex emulsion, said third non-carboxylated styrene-butadiene latex emulsion containing about 47% total solids by weight and having a Brookfield viscosity at 25° C. of about 200 cps, a pH of about 9.5–10.0, a Mooney value of about 70–75, a surface tension of about 60–65 dynes/cm, a particle size of about 640–720 Angstroms and a bound styrene content of about 22–26%. Preferably, said first non-carboxylated styrene-butadiene latex emulsion constitutes about 30–50% (more preferably about 40%), by weight, of the total composition, said second non-carboxylated styrene-butadiene latex emulsion constitutes about 5–20% (more preferably about 10%), by weight, of the total composition, and said third non-carboxylated styrene-butadiene latex emulsion constitutes about 10–30% (more preferably about 20%), by weight, of the total composition, said first, second and third non-carboxylated styrene-butadiene latex emulsions together constituting approximately 70%, by weight, of the total composition.

According to still another embodiment, said latex emulsion blend comprises the above-described first and third non-carboxylated styrene-butadiene latex emulsions. Preferably, said first non-carboxylated styrene-butadiene latex emulsion constitutes about 30–50%, by weight, of the total composition, and said third non-carboxylated styrene-butadiene latex emulsion constitutes about 10–30%, by weight, of the total composition, said first and said third non-carboxylated styrene-butadiene latex emulsions together constituting approximately 70%, by weight, of the total composition.

An example of said first non-carboxylated styrene-butadiene latex emulsion is PLIOLITE® LPF-2108 (Goodyear Tire and Rubber Company, Akron, Ohio), which the present inventors have come to understand is to be discontinued by Goodyear and replaced with PLIOLITE® LPF-3757 (which, apparently, is different in composition from the PLIOLITE® LPF-3757 emulsion referred to in Lin et al.). An example of said second non-carboxylated styrene-butadiene latex emulsion is BUTONAL® NS 104 (BASF Corporation, Charlotte, N.C.), and an example of said third non-carboxylated styrene-butadiene latex emulsion is BUTOFAN® NS 103 (BASF Corporation, Charlotte, N.C.).

The present inventors have found that inks containing a blend of two or more of the above-described latex emulsions are superior to corresponding inks containing only a single such latex emulsion in that the inks containing a blend permit greater control over the surface tension of the final ink composition than do inks containing a single latex emulsion. This is significant because surface tension has an effect on the extent of penetration of the ink into the marking substrate.

For each of the embodiments described above, one can extend the period of time over which ink 101 remains erasable after being applied to a porous or non-porous marking substrate by increasing the amount of said first non-carboxylated styrene-butadiene latex emulsion in the ink relative to the amounts of said second and third non-carboxylated styrene-butadiene latex emulsions present therein. Alternatively and preferably, the erasability of ink 101 may be extended by including therein an antioxidant, such as a tocopherol (vitamin E). The time-extending effect of the tocopherol may be further enhanced by the concurrent addition of vitamin C to ink 101. This may be accomplished through the use of Oxynex® K liquid, a commercially available antioxidant preparation from E. Merck (Germany) which includes both a tocopherol (constituting about 30% by weight of the preparation) and vitamin C (constituting about 6% by weight of the preparation). Preferably, Oxynex® K is added to the present composition in an amount constituting about 0.1–0.7%, preferably 0.15%, by weight of ink 101.

Ink 101 preferably further comprises a shear-stabilizing agent which is included in the composition to prevent coagulation of the discontinuous rubber phase under conditions of high shear, such as during formulation (i.e., mixing) of the composition or during application of the composition to a marking substrate. The shear-stabilizing agent is preferably a fatty acid salt. Potassium oleate is a particularly preferred shear-stabilizing agent and is preferably present in ink 101 in an amount constituting about 0.2–1.5%, dry weight, of the dry weight of the non-carboxylated styrene-butadiene copolymer of the latex emulsion blend. More preferably, potassium oleate constitutes about 0.6%, by weight, of ink 101. Another example of a shear-stabilizing agent is Modicol® S, a sulfated fatty acid commercially available from Henkel Corporation, Ambler, Pa.

Ink 101 preferably further comprises a pH-adjusting agent, which is used to shift the pH of the composition to a pH of about 9–10. Preferably, the pH-adjusting agent is triethanolamine (TEA), which is present in an amount constituting about 0.5–1.5% (preferably about 1.0%), by weight, of ink 101.

Ink 101 preferably further comprises an anti-drying agent. Preferably, said anti-drying agent includes one or more water-soluble organic ketones, esters and alcohols that do not have a significant deleterious effect on the composition or its properties and whose boiling point is relatively high, e.g., from about 140° C. to about 300° C. Examples of suitable anti-drying agents include sorbitol (preferably of a non-crystallizing variety), glycerine, urea or a mixture thereof. Preferably, the anti-drying agent comprises a 1:1, 2:1 or 3:1 mixture of sorbitol to glycerine, respectively. A mixture comprising a 3:1 ratio of sorbitol to glycerine is more preferred, and such a 3:1 mixture constitutes about 3–15%, preferably about 7%, by weight, of ink 101.

Ink 101 preferably further includes an anti-corrosion agent. Preferably, said anti-corrosion agent is benzotriazol and/or EDTA present in a total amount constituting about 0.2–0.5% (preferably about 0.2%), by weight, of ink 101.

Ink 101 may also include an alkyl acrylate copolymer emulsion for use in improving the smoothness of writing of the ink. Best results are obtained when such an alkyl acrylate copolymer emulsion, if used, is added to non-carboxylated styrene-butadiene latex emulsion blends of the type not containing BUTONAL® NS 104.

The following Examples are provided herein merely for the purpose of being illustrative of various formulations of ink 101. These Examples should in no way be construed as being limiting.

EXAMPLE 1

| Ingredient | % by weight |
|---|---|
| PLIOLITE ® 2108 | 40.0 |
| BUTOFAN ® NS 103 | 15.0 |
| BUTANOL ® NS 104 | 15.0 |
| 3% Laponite ® XLG in 40% glycerine and 57% water | 7.0 |
| 3:1 Sorbitol/Glycerine | 7.0 |
| Triethanolamine | 1.0 |
| Oxynex ® K liquid | 0.15 |
| Potassium oleate | 0.5 |
| Black 4343 | 2.0 |
| Deionized water | 12.35 |
| pH of composition | 9.58 |
| viscosity of composition (measured at 20° C. using a rotary viscometer in which a tapered cone is rotating at a fixed velocity to give a shear rate of 0.2 reciprocal seconds) | 74.7 cps |

EXAMPLE 2

| Ingredient | % by weight |
|---|---|
| PLIOLITE ® 2108 | 40.0 |
| BUTOFAN ® NS 103 | 15.0 |
| BUTANOL ® NS 104 | 15.0 |
| 3% Laponite ® XLG in 40% glycerine and 57% water | 7.0 |
| 3:1 Sorbitol/Glycerine | 7.0 |
| Triethanolamine | 1.0 |
| Oxynex ® K liquid | 0.15 |
| Potassium oleate | 0.5 |
| Unisperse Black B-Pl | 2.0 |
| Deionized water | 12.35 |
| pH of composition | 9.65 |
| viscosity of composition (measured at 20° C. using a rotary viscometer in which a tapered cone is rotating at a fixed velocity to give a shear rate of 0.2 reciprocal seconds) | 52.7 cps |

EXAMPLE 3

| Ingredient | % by weight |
|---|---|
| PLIOLITE ® 2108 | 40.0 |
| BUTOFAN ® NS 103 | 15.0 |
| BUTANOL ® NS 104 | 15.0 |
| 3% Laponite ® XLG in 40% glycerine and 57% water | 7.0 |
| 3:1 Sorbitol/Glycerine | 7.0 |
| Triethanolamine | 0.5 |
| Oxynex ® K liquid | 0.15 |
| Potassium oleate | 0.5 |
| Black 4343 | 2.0 |
| Deionized water | 12.85 |

-continued

| Ingredient | % by weight |
|---|---|
| pH of composition | 9.43 |
| viscosity of composition (measured at 20° C. using a rotary viscometer in which a tapered cone is rotating at a fixed velocity to give a shear rate of 0.2 reciprocal seconds) | 92.6 cps |

EXAMPLE 4

| Ingredient | % by weight |
|---|---|
| PLIOLITE ® 2108 | 45.0 |
| BUTANOL ® NS 104 | 25.0 |
| 3% Laponite ® XLG in 40% glycerine and 57% water | 7.0 |
| 3:1 Sorbitol/Glycerine | 7.0 |
| Triethanolamine | 1.0 |
| Oxynex ® K liquid | 0.15 |
| Potassium oleate | 0.5 |
| Black 4343 | 2.0 |
| Deionized water | 12.35 |
| pH of composition | 9.66 |
| viscosity of composition (measured at 20° C. using a rotary viscometer in which a tapered cone is rotating at a fixed velocity to give a shear rate of 0.2 reciprocal seconds) | 77.4 cps |

EXAMPLE 5

| Ingredient | % by weight |
|---|---|
| PLIOLITE ® 2108 | 40.0 |
| BUTOFAN ® NS 103 | 20.0 |
| BUTANOL ® NS 104 | 10.0 |
| 3% Laponite ® XLG in 40% glycerine and 57% water | 7.0 |
| 3:1 Sorbitol/Glycerine | 7.0 |
| Triethanolamine | 1.0 |
| Oxynex ® K liquid | 0.15 |
| Potassium oleate | 0.6 |
| Benzotriazol | 0.15 |
| Black 4343 | 2.0 |
| Deionized water | residual to 100% |

The embodiments of the present invention described above are intended to be merely exemplary and those skilled in the art shall be able to make numerous variations and modifications to it without departing from the spirit of the present invention. All such variations and modifications are intended to be within the scope of the present invention as defined in the appended claims.

What is claimed is:

1. An ink that is erasable from both porous and non-porous marking substrates by substantially non-abrasive mechanical means, said ink comprising:

(a) a latex emulsion blend comprising a first non-carboxylated styrene-butadiene latex emulsion and a second non-carboxylated styrene-butadiene latex emulsion, said latex emulsion blend being characterized by its ability to be transformed, upon being contacted with the surface of a porous marking substrate, from a first state in which said latex emulsion blend is stable to a second state in which said latex emulsion blend is unstable and the styrene-butadiene phase rapidly agglomerates to form a cohesive film deposited directly on the surface of the porous marking substrate and erasable therefrom by substantially non-abrasive mechanical means;

(b) a colorant dispersed in the latex emulsion blend, the colorant being characterized by its association with the cohesive rubber phase film when said latex emulsion blend is transformed into said second state; and (c) a shear-thinning, viscosity-adjustment agent.

2. The ink as claimed in claim 1 wherein said shear-thinning, viscosity-adjustment agent comprises an inorganic clay material.

3. The ink as claimed in claim 2 wherein said shear-thinning, viscosity-adjustment agent comprises a hydrous sodium lithium magnesium silicate synthetic smectite clay.

4. The ink as claimed in claim 3 wherein said shear-thinning, viscosity-adjustment agent comprises a 3% solution, by weight, of a hydrous sodium lithium magnesium silicate synthetic smectite clay in 57%, by weight, water and 40%, by weight, glycerine.

5. The ink as claimed in claim 4 wherein said shear-thinning, viscosity-adjustment agent constitutes about 3–10%, by weight, of the ink.

6. The ink as claimed in claim 5 wherein said shear-thinning, viscosity-adjustment agent constitutes about 7%, by weight, of the ink.

7. The ink as claimed in claim 1 wherein the ink has a viscosity of about 30 cps to about 300 cps when measured at 20° C. using a rotary viscometer in which a tapered cone is rotating at a fixed velocity to give a shear rate of 0.2 reciprocal seconds.

8. The ink as claimed in claim 1 wherein said colorant is a water-insoluble or water-dispersible pigment that is also oliophilic.

9. The ink as claimed in claim 1 wherein said colorant constitutes about 2–5%, by weight, of the ink.

10. The ink as claimed in claim 1 wherein said latex emulsion blend comprises a first non-carboxylated styrene-butadiene latex emulsion which contains about 40% total solids by weight and which has a Brookfield viscosity at 25° C. of about 30 cps, a pH of about 10.5–11.7, a Mooney value of about 150–160, a surface tension of about 55–65 dynes/cm, a particle size of about 650 Angstroms and a bound styrene content of about 21–29%, and a second non-carboxylated styrene-butadiene latex emulsion which contains about 70% total solids by weight and which has a Brookfield viscosity at 25° C. of about 1200 cps, a pH of about 10.0–10.5, a Mooney value of about 70–75, a surface tension of about 32–36 dynes/cm, and a bound styrene content of about 22–26%.

11. The ink as claimed in claim 10 wherein said first non-carboxylated styrene-butadiene latex emulsion constitutes about 45–50%, by weight, of the ink, and said second non-carboxylated styrene-butadiene latex emulsion constitutes about 20–25%, by weight, of the ink, said first and said second non-carboxylated styrene-butadiene latex emulsions together constituting approximately 70%, by weight, of the ink.

12. The ink as claimed in claim 1 wherein said latex emulsion blend comprises a first non-carboxylated styrene-butadiene latex emulsion which contains about 40% total solids by weight and which has a Brookfield viscosity at 25° C. of about 30 cps, a pH of about 10.5–11.7, a Mooney value of about 150–160, a surface tension of about 55–65 dynes/cm, a particle size of about 650 Angstroms and a bound styrene content of about 21–29%, a second non-carboxylated styrene-butadiene latex emulsion which contains about 70% total solids by weight and which has a Brookfield viscosity at 25° C. of about 1200 cps, a pH of about 10.0–10.5, a Mooney value of about 70–75, a surface tension of about 32–36 dynes/cm, and a bound styrene content of about 22–26%, and a third non-carboxylated styrene-butadiene latex emulsion containing about 47% total solids by weight and having a Brookfield viscosity at 25° C. of about 200 cps, a pH of about 9.5–10.0, a Mooney value of about 70–75, a surface tension of about 60–65 dynes/cm, a particle size of about 640–720 Angstroms and a bound styrene content of about 22–26%.

13. The ink as claimed in claim 12 wherein said first non-carboxylated styrene-butadiene latex emulsion constitutes about 30–50%, by weight, of the ink, said second non-carboxylated styrene-butadiene latex emulsion constitutes about 5–20%, by weight, of the ink, and said third non-carboxylated styrene-butadiene latex emulsion constitutes about 10–30%, by weight, of the ink, said first, second and third non-carboxylated styrene-butadiene latex emulsions together constituting approximately 70%, by weight, of the ink.

14. The ink as claimed in claim 13 wherein said first non-carboxylated styrene-butadiene latex emulsion constitutes about 40%, by weight, of the ink, said second non-carboxylated styrene-butadiene latex emulsion constitutes about 10%, by weight, of the ink, and said third non-carboxylated styrene-butadiene latex emulsion constitutes about 20%, by weight, of the ink.

15. The ink as claimed in claim 1 comprising a first non-carboxylated styrene-butadiene latex emulsion which contains about 40% total solids by weight and which has a Brookfield viscosity at 25° C. of about 30 cps, a pH of about 10.5–11.7, a Mooney value of about 150–160, a surface tension of about 55–65 dynes/cm, a particle size of about 650 Angstroms and a bound styrene content of about 21–29% and a third non-carboxylated styrene-butadiene latex emulsion containing about 47% total solids by weight and having a Brookfield viscosity at 25° C. of about 200 cps, a pH of about 9.5–10.0, a Mooney value of about 70–75, a surface tension of about 60–65 dynes/cm, a particle size of about 640–720 Angstroms and a bound styrene content of about 22–26%.

16. The ink as claimed in claim 1 further comprising an antioxidant.

17. The ink as claimed in claim 16 wherein said antioxidant comprises a tocopherol.

18. The ink as claimed in claim 16 wherein said antioxidant comprises a preparation comprising about 30%, by weight, tocopherol and about 6%, by weight, vitamin C.

19. The ink as claimed in claim 18 wherein said antioxidant constitutes about 0.1–7%, by weight, of the ink.

20. The ink as claimed in claim 19 wherein said antioxidant constitutes about 0.15%, by weight, of the ink.

21. The ink as claimed in claim 1 further comprising a shear-stabilizing agent for preventing coagulation of the discontinuous rubber phase under shear.

22. The ink as claimed in claim 21 wherein said shear-stabilizing agent comprises a fatty acid salt.

23. The ink as claimed in claim 22 wherein said shear-stabilizing agent is potassium oleate.

24. The ink as claimed in claim 23 wherein said shear-stabilizing agent constitutes about 0.2–1.5%, dry weight, of the dry weight of the non-carboxylated styrene-butadiene copolymer of the latex emulsion blend.

25. The ink as claimed in claim 23 wherein said shear-stabilizing agent constitutes about 0.5%, by weight, of the ink.

26. The ink as claimed in claim 1 further comprising a pH-adjusting agent for shifting the pH of the composition to a pH of about 9–10.

27. The ink as claimed in claim 26 wherein said pH-adjusting agent is triethanolamine.

28. The ink as claimed in claim 27 wherein triethanolamine is present in an amount constituting about 0.5–1.0%, by weight, of the ink.

29. The ink as claimed in claim 1 further comprising an anti-drying agent.

30. The ink as claimed in claim 29 wherein said anti-drying agent comprises a mixture of sorbitol and glycerine.

31. The ink as claimed in claim 29 wherein said anti-drying agent comprises a 3:1 mixture of sorbitol to glycerine.

32. The ink as claimed in claim 31 wherein said anti-drying agent constitutes about 3–15%, by weight, of the ink.

33. The ink as claimed in claim 32 wherein said anti-drying agent constitutes about 7%, by weight, of the ink.

34. The ink as claimed in claim 1 further comprising an alkyl acrylate copolymer emulsion.

35. The ink as claimed in claim 1 further comprising an anti-corrosion agent.

36. A method of making a marking that is erasable from a porous marking substrate by substantially non-abrasive mechanical means, said method comprising the step of applying the ink of claim 1 to a porous marking substrate using a filler-less, nibless, roller-ball pen.

* * * * *